United States Patent
Trempala

(10) Patent No.: US 9,341,299 B2
(45) Date of Patent: *May 17, 2016

(54) LOCKING CAP SYSTEM

(71) Applicant: Knox Associates, Inc., Phoenix, AZ (US)

(72) Inventor: Dohn J. Trempala, Phoenix, AZ (US)

(73) Assignee: Knox Associates, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,937

(22) Filed: Sep. 26, 2014

(65) Prior Publication Data

US 2015/0075647 A1    Mar. 19, 2015

Related U.S. Application Data

(63) Continuation of application No. 11/854,881, filed on Sep. 13, 2007, now Pat. No. 8,991,434.

(60) Provisional application No. 60/825,627, filed on Sep. 14, 2006.

(51) Int. Cl.
| | |
|---|---|
| *F16L 55/10* | (2006.01) |
| *F16L 55/115* | (2006.01) |
| *E03B 9/10* | (2006.01) |
| *E03B 9/02* | (2006.01) |
| *E05B 73/00* | (2006.01) |
| *F16K 35/06* | (2006.01) |
| *F16K 35/10* | (2006.01) |

(52) U.S. Cl.
CPC ............... *F16L 55/1152* (2013.01); *E03B 9/02* (2013.01); *E03B 9/10* (2013.01); *E05B 73/00* (2013.01); *F16K 35/06* (2013.01); *F16K 35/10* (2013.01); *Y10T 70/558* (2015.04); *Y10T 137/7069* (2015.04)

(58) Field of Classification Search
CPC . F16L 55/115; F16L 55/1152; F16L 55/1155; F16L 55/124
USPC ................. 138/89; 220/284, 297, 348, 349
See application file for complete search history.

(56) References Cited

U.S. PATENT DOCUMENTS

| | | |
|---|---|---|
| 703,016 A | 6/1902 | Tash |
| 737,667 A | 9/1903 | Schunck |
| 1,161,158 A | 11/1915 | Rennert |
| 1,349,610 A | 8/1920 | Gibney |
| 1,362,647 A | 12/1920 | Strone et al. |
| 1,892,904 A | 1/1933 | Quint et al. |
| 2,283,371 A | 5/1942 | Johnson |
| 2,315,102 A | 3/1943 | Adams |
| 2,463,138 A | 3/1949 | Bamberg |
| 2,565,669 A | 8/1951 | Smith |
| 2,777,353 A | 1/1957 | Willis |
| D192,653 S | 4/1962 | Madeira |
| 3,136,148 A | 6/1964 | Nehls |

(Continued)

*Primary Examiner* — James Hook
(74) *Attorney, Agent, or Firm* — Knobbe Martens Olson & Bear LLP

(57) ABSTRACT

A lockable pipe cover includes an inner cap and an outer cover which are selectively coupled together for axial rotation. When the cap is locked, the inner cap and the outer cover are free to rotate independently from one another thus rotation of the outer cover will not remove the cap from the pipe. In the unlocked position, the inner cap and the outer cover are coupled for rotation and thus rotation of the outer cover results in rotation of the inner cap.

20 Claims, 7 Drawing Sheets

(56) References Cited

U.S. PATENT DOCUMENTS

| | | | |
|---|---|---|---|
| D206,455 S | 12/1966 | Thompson | |
| 3,361,460 A | 1/1968 | Jansen | |
| 3,603,132 A | 9/1971 | Holmes | |
| 3,695,139 A | 10/1972 | Howe | |
| 3,738,691 A | 6/1973 | Firth | |
| 3,855,882 A | 12/1974 | Wittmann | |
| 3,914,966 A | 10/1975 | Bello | |
| 3,915,335 A | 10/1975 | Shanklin et al. | |
| 4,000,633 A | 1/1977 | Evans | |
| 4,022,536 A | 5/1977 | Piepho et al. | |
| 4,100,629 A | 7/1978 | Jones et al. | |
| 4,140,413 A | 2/1979 | Conrad | |
| 4,141,574 A | 2/1979 | Stansifer et al. | |
| 4,143,530 A | 3/1979 | Murtezov et al. | |
| 4,172,606 A | 10/1979 | Howe | |
| 4,182,361 A | 1/1980 | Oakey | |
| 4,184,516 A | 1/1980 | Oesterritter et al. | |
| 4,299,102 A | 11/1981 | Aro | |
| 4,351,446 A | 9/1982 | Madden | |
| 4,384,812 A | 5/1983 | Miyagawa | |
| 4,436,219 A * | 3/1984 | Reutter | 220/295 |
| 4,480,513 A | 11/1984 | McCauley et al. | |
| 4,526,193 A | 7/1985 | Drach | |
| 4,527,407 A | 7/1985 | Shanklin | |
| 4,566,481 A | 1/1986 | Leopold, Jr. et al. | |
| 4,602,654 A | 7/1986 | Stehling et al. | |
| 4,633,896 A | 1/1987 | Bainbridge et al. | |
| 4,651,771 A | 3/1987 | Borenstein et al. | |
| 4,674,306 A | 6/1987 | Halpern | |
| 4,742,702 A | 5/1988 | Swertz | |
| 4,794,768 A | 1/1989 | Moser et al. | |
| 4,905,547 A | 3/1990 | Nigrelli | |
| 5,033,501 A | 7/1991 | Stehling | |
| 5,037,260 A | 8/1991 | Rubin | |
| 5,072,750 A | 12/1991 | Poms et al. | |
| 5,148,727 A | 9/1992 | Williamson | |
| 5,219,254 A | 6/1993 | Ball et al. | |
| 5,295,831 A | 3/1994 | Patterson et al. | |
| 5,381,919 A | 1/1995 | Griffin et al. | |
| 5,383,495 A | 1/1995 | Kennedy | |
| 5,390,573 A | 2/1995 | Mann | |
| 5,419,650 A | 5/1995 | Hoshino | |
| 5,437,309 A | 8/1995 | Timmons | |
| 5,462,381 A | 10/1995 | Dewachter et al. | |
| 5,520,300 A * | 5/1996 | Griffin | 220/210 |
| 5,549,133 A | 8/1996 | Sigelakis | |
| 5,588,460 A | 12/1996 | Meneses | |
| 5,632,301 A | 5/1997 | Julicher | |
| 5,667,093 A | 9/1997 | Lefevre | |
| D387,657 S | 12/1997 | Holmes | |
| 5,704,261 A | 1/1998 | Strauch et al. | |
| 5,797,659 A | 8/1998 | Fuller | |
| 5,803,110 A | 9/1998 | Segal | |
| D400,769 S | 11/1998 | Duke | |
| 5,863,166 A | 1/1999 | Young | |
| 5,868,047 A | 2/1999 | Faust et al. | |
| 5,904,057 A | 5/1999 | Abney, III et al. | |
| 5,947,318 A | 9/1999 | Palm | |
| D415,676 S | 10/1999 | Negishi et al. | |
| 5,970,552 A | 10/1999 | Kwlecien et al. | |
| 6,003,558 A | 12/1999 | Neto et al. | |
| 6,017,177 A | 1/2000 | Lanham | |
| 6,029,709 A | 2/2000 | Burgess | |
| 6,044,670 A * | 4/2000 | Citurs et al. | 70/169 |
| 6,070,442 A * | 6/2000 | Neeley et al. | 70/175 |
| 6,089,253 A | 7/2000 | Stehling et al. | |
| 6,112,761 A | 9/2000 | Scotto | |
| RE36,959 E | 11/2000 | Griffin | |
| 6,199,414 B1 | 3/2001 | Chang | |
| 6,213,331 B1 * | 4/2001 | Morgan et al. | 220/295 |
| 6,340,933 B1 | 1/2002 | Chen et al. | |
| 6,487,882 B2 * | 12/2002 | Trempala | 70/169 |
| D472,434 S | 4/2003 | Trempala | |
| 6,550,294 B2 | 4/2003 | Garguilo | |
| 6,553,795 B1 * | 4/2003 | Trempala | 70/167 |
| 6,571,588 B1 | 6/2003 | Yuen | |
| 6,694,783 B2 | 2/2004 | Trempala | |
| 6,698,261 B2 | 3/2004 | Trempala | |
| 6,712,544 B2 * | 3/2004 | Kruger et al. | 403/408.1 |
| 6,802,338 B1 | 10/2004 | Istre, Jr. | |
| 6,907,760 B2 | 6/2005 | Trempala | |
| 6,908,271 B2 | 6/2005 | Breslin | |
| 6,910,355 B2 * | 6/2005 | Swanson | 70/232 |
| 7,140,212 B2 | 11/2006 | Trempala | |
| 8,991,434 B2 * | 3/2015 | Trempala | 138/89 |
| 2005/0017865 A1 * | 1/2005 | Belden, Jr. | 340/572.9 |

* cited by examiner

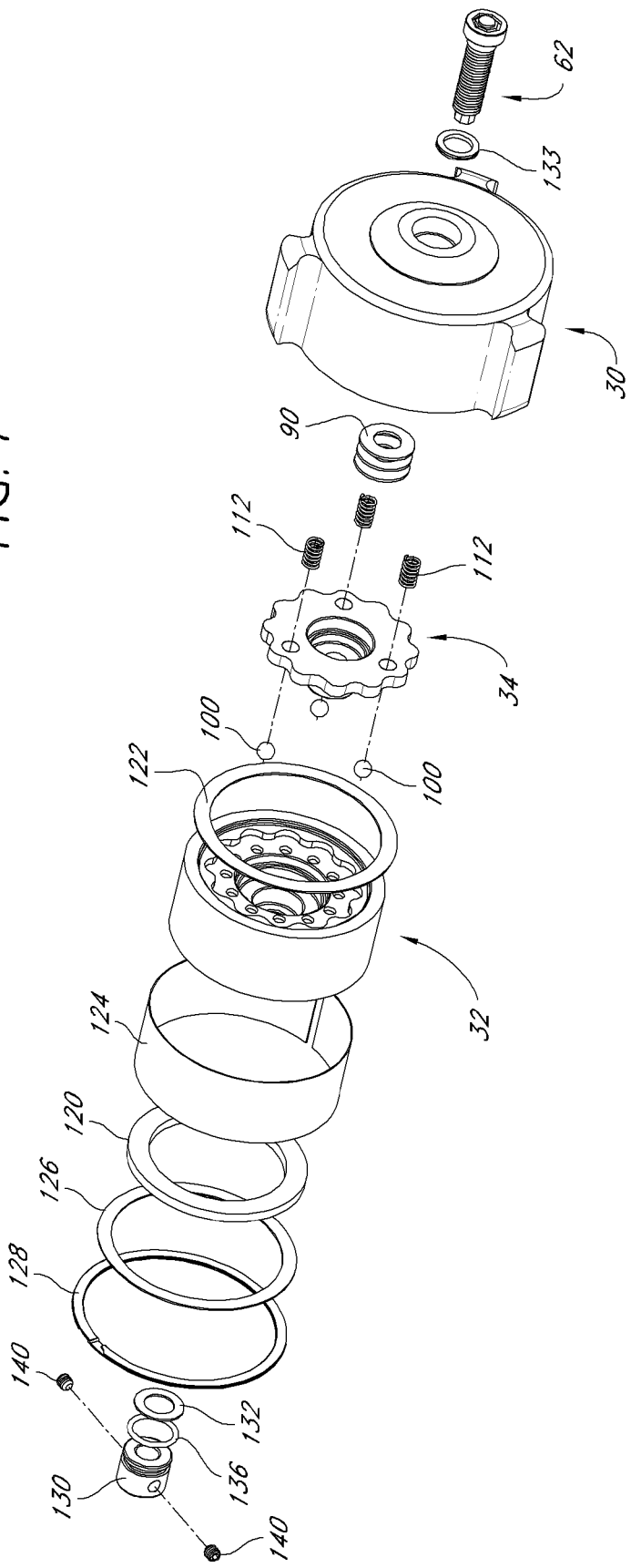

ns

LOCKING CAP SYSTEM

CROSS-REFERENCE TO RELATED APPLICATIONS

This application is a continuation of U.S. patent application Ser. No. 11/854,881, filed Sep. 13, 2007, which claims priority pursuant to 35 U.S.C. §119(e) from U.S. Provisional Patent Application No. 60/825,627, filed Sep. 14, 2006, each of which is hereby incorporated by reference in its entirety.

BACKGROUND OF THE INVENTION

1. Field of the Invention

The present invention generally relates to a cap system for capping the end of a pipe. More particularly, the present invention relates to a lockable end cap used to close a male end of a pipe, such as found on a fire hydrant.

2. Description of the Related Art

Fire hydrants and other such water sources often are located in unsecured locations. Thus, public water supplies frequently are subject to theft by individuals that connect tanker trucks or the like to the fire hydrants and then turn on the water supply from the fire hydrant. Such theft of public water comes at an expense to the ordinary consumer. Thus, there is a desire to secure such unsecured water sources.

SUMMARY OF THE INVENTION

A need therefore exists for a lockable cap system than can be used with the end of a pipe to reduce the likelihood of access by unauthorized persons. Such a cap system also could be useful in applications relating to fire departments, public works departments, chemical industries, petroleum industries, and the like.

Thus, one aspect of the present invention relates to a lockable pipe cap comprising an inner cap. The inner cap comprising a portion of a pipe closure comprises an outer surface. An outer cover covers substantially all of the outer surface of the inner cap. The inner cap and the outer cover are selectively coupled by an axially translatable traveler. The traveler is axially translatable between at least a first position and a second position. The traveler is engaged with both the inner cap and the outer cover when in the first position. The traveler is engaged with only one of the inner cap and the outer cover when in the second position. The inner cap and the outer cover are independently rotatable when the traveler is in the second position. The traveler is movable between the first position and the second position by a lead screw. The lead screw is rotatable by an exposed end of the lead screw. The exposed end is accessible from an outer surface of the lockable cap.

Another aspect of the present invention involves a lockable pipe cap comprising an inner cap defining a portion of a pipe closure comprising an outer surface. An outer cover covers substantially all of the outer surface of the inner cap. The inner cap and the outer cover are axially coupled about a central axis. Means are provided for selectively interlocking the inner cap and the outer cover such that the inner cap and the outer cover are coupled for rotation when interlocked and such that the outer cover is not coupled to the inner cap for rotation when not interlocked.

A further aspect of the present invention involves a method of removing a lockable pipe cover. The method comprises rotating an outer cover relative to an inner cap to a detented position with the detented position indicating that the cap is in a condition for unlocking. The inner cap defines a pipe closure. The method also comprises turning a lead screw to move a traveler such that the traveler interlocks the outer cover and the inner cap of the lockable cap and removing the lockable cap by rotating the outer cover while the outer cover is engaged with the inner cap.

An aspect of the present invention also involves a lockable pipe cap. The lockable pipe cap comprises a cylindrical outer cover. The cylindrical outer cover defines a first inner recess and a second inner recess. The second inner recess is sized smaller than the first inner recess and comprises a non circular shape. An outer surface of the outer cover comprises at least one elongated rib. An inner surface of the outer cover comprises a plurality of cylindrical holes with each of the cylindrical holes housing a spring that loads a corresponding ball. The lockable pipe cap also comprises a cylindrical inner cap. The inner cap fits inside the first recess of the outer cover. A third recess is defined at least in part by a front surface of the inner cap. The third recess is in communication with the second recess of the outer cover and comprises the non-circular shape. The third recess and the second recess are generally alignable. A portion of a pipe closure is formed in a rearward facing recess of the inner cap. The inner cap comprises detents, each of which is sized to receive a portion of the spring loaded balls. A traveler comprises an outer edge with the outer edge comprising the noncircular shape. The traveler is movable axially from at least a portion of the second recess of the outer cover to at least a portion of the third recess of the inner cap such that, when the traveler is positioned partly in the second recess and partly in the third recess, the traveler couples the outer cover to the inner cap for conjoint rotation. A lead screw assembly is located on a central axis of the cap. The lead screw assembly comprises a head that comprises a socket. The head is exposed through the outer cover. The lead screw assembly engages with a threaded hole of the traveler such that a rotation of the lead screw results in an axial movement of the traveler.

BRIEF DESCRIPTION OF THE DRAWINGS

These and other features, aspects and advantages of the present invention are described below with reference to drawings of a preferred embodiment, which embodiment is intended to illustrate, but not to limit, the present invention. The drawings comprise seven figures.

FIG. 7 is an explode perspective view of the locking cap of FIG. 1.

DETAILED DESCRIPTION OF THE PREFERRED EMBODIMENT

Embodiments of a locking cap will be described herein with reference to relative directions and positions. For ease of understanding, directional conventions have been selected that will refer to the locking cap as positioned over a mating pipe end. In short, the front of the locking cap will refer to a view looking directly into an otherwise open pipe end. In the illustrated configurations, the front of the locking cap comprises a generally circular appearance. The side of the locking cap will refer to a view that is generally normal to the front of the locking cap. In the illustrated configurations, the side of the locking cap comprises a profile bounded by generally parallel lines indicative of a generally cylindrical shape but other shapes can be used as desired. This directional convention will extend to all assemblies and components discussed below. These relative directions are used only to help to describe the embodiments and are in no way intended to limit the scope of the technology.

Figure 1:
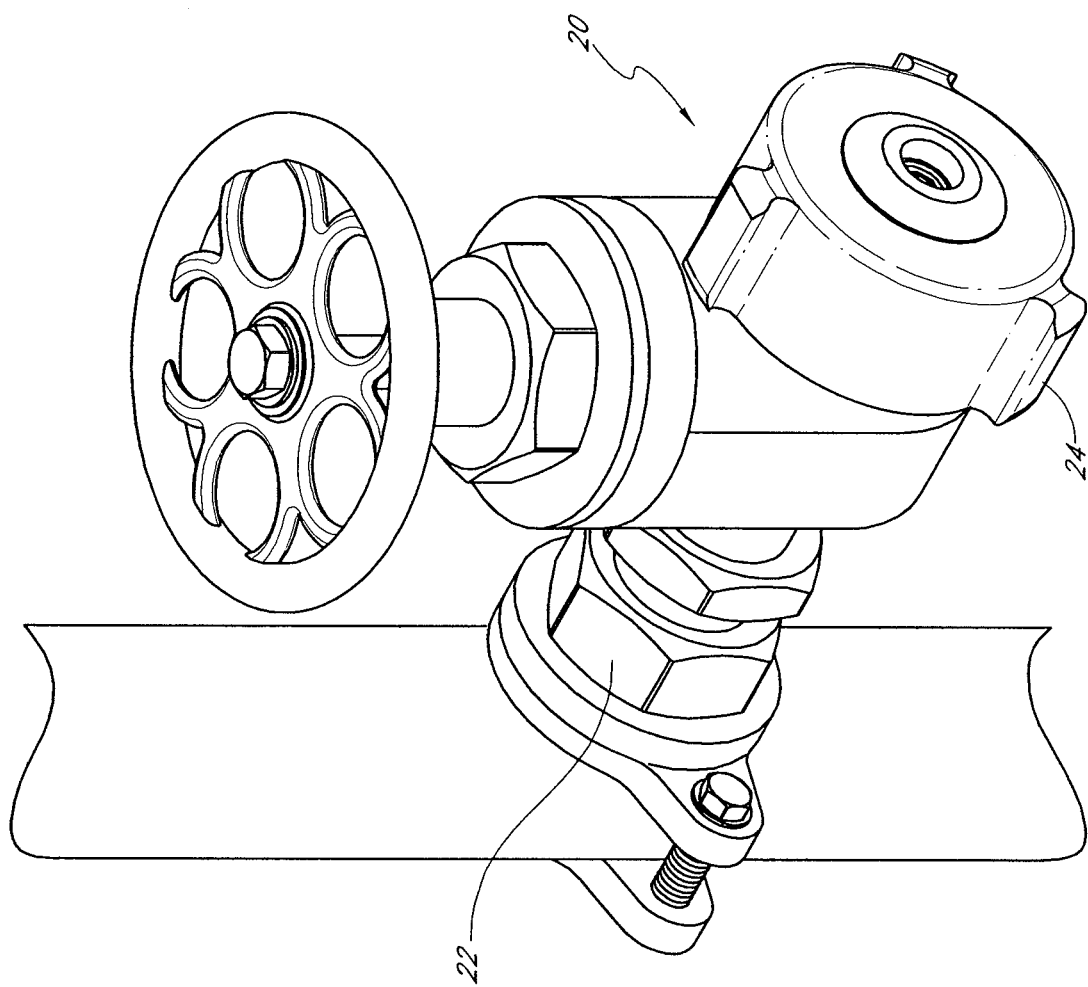
FIG. 1 is a perspective view of a locking cap that is arranged and configured in accordance with certain features, aspects and advantages of the present invention. The locking cap is shown installed on a standpipe.

With reference now to FIG. 1, a fire stand pipe connection 20 is illustrated in which an outlet pipe 22 is covered by a lockable cap 24. The cap 24 can be used with any number of open pipe ends, typically male threaded pipe ends, and also has particular utility with openings on fire hydrants or the like. The cap 24 can provide a water-tight closure or can simply enclose an otherwise open end of the associated outlet pipe 22. Advantageously, the cap 24 extends over an outer portion of the associated outlet pipe 22. The cap 24 preferably is configured to be threadably engaged with the male pipe end 22 and more preferably is configured to be locked in position. As used herein, "locked in position" generally refers to a configuration where an outer portion of the locking cap 24 spins independently of an inner portion. The cap 24 can be secured thereto such that the cap 24 reduces or eliminates the ability of individuals to take water from the associated outlet pipe 20 without authorization, for example. In one advantageous configuration, the locking cap 24 protects a sufficient number of thread turns such that vandals are less likely to render the pipe threads unusable by fire department personnel when coupling a hose to the pipe or hydrant, for instance.

Figure 2:
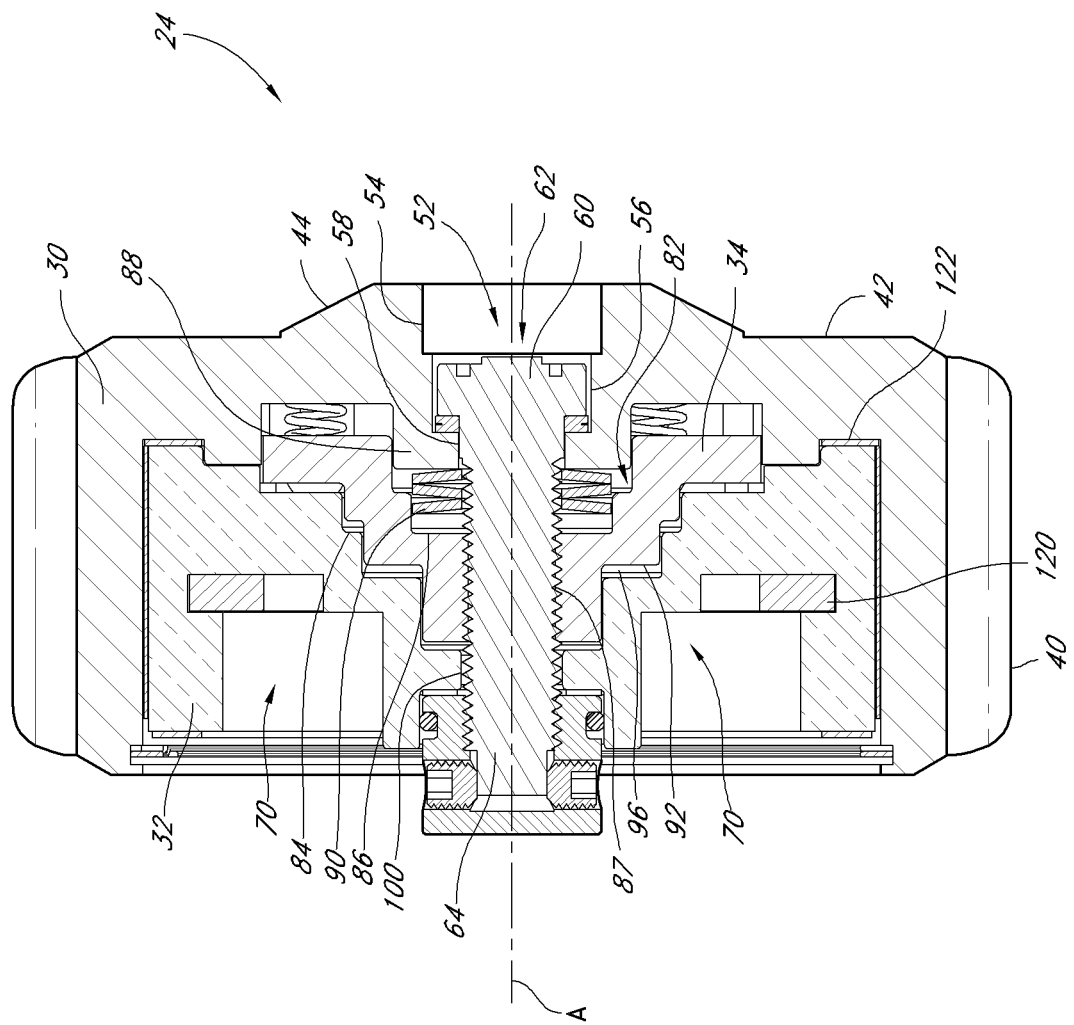
FIG. 2 is a sectioned view of the locking cap of FIG. 1.

With reference now to FIG. 2, the cap 24 generally comprises an outer cover 30 that can be coupled to and decoupled from an inner cap 32. The inner cap 32 can be coupled to the end of the outlet pipe 22 in any suitable manner. In the illustrated configuration, the inner cap 32 will be threaded onto the end of the outlet pipe 22 while the outer cover 30 is coupled to the inner cap 32. Once the cap 24 is installed on the end of the outlet pipe 22, the outer cover 30 can be decoupled from the inner cap 32 such that the outer cover 30 will simply rotate relative to the inner cap 32 if torque is applied to the outer cover 30.

With reference still to FIG. 2, a traveler 34 moves axially to couple and decouple the outer cover 30 and the inner cap 32. The traveler 34 moves between at least a first position in which it bridges a gap between the inner cap 32 and the outer cover 30 (i.e., the unlocked position) and a second position in which it does not contact at least one of the inner cap 32 and the outer cover 30 (i.e., the locked position). In the illustrated configuration, the traveler moves to a position where it no longer engages the inner cap 32 such that the inner cap 32 and the outer cover 30 are no longer coupled.

The outer cover 30 can have any suitable shape and configuration. The depicted embodiment of the outer cover 30 preferably is made of a sintered stainless steel. Other suitable material, such as cast iron, sintered brass, plastic, or carbon fiber, for instance but without limitation, can be used to make the outer cover 30. The sintered stainless steel improves manufacturability and reduces the likelihood that the cover 30 will corrode when used in a wet environment.

Figure 3:
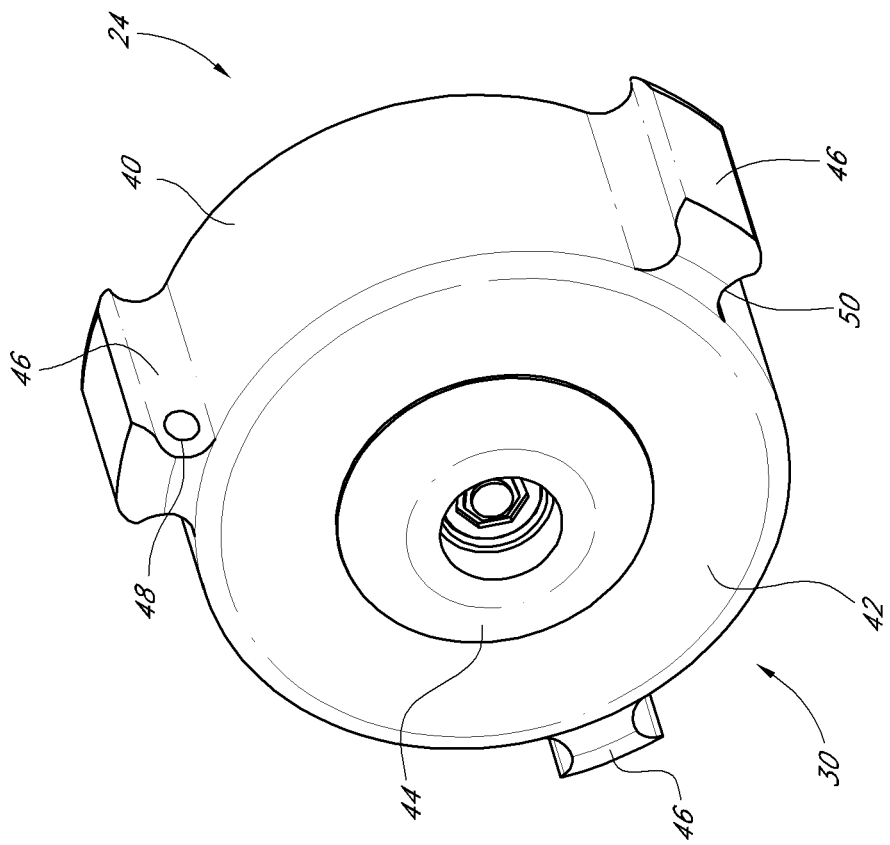
FIG. 3 is a perspective view of the locking cap of FIG. 1.

As shown in FIG. 3, the illustrated outer cover 30 is generally cylindrical with one substantially closed end. In other words, the illustrated outer cover 30 comprises a generally cylinder outer wall 40 and a generally circular end wall 42. Preferably, the end wall 42 comprises a protruding boss 44. The boss 44 reinforces a portion of the end wall 42 while also providing a distinctive appearance to the cap 24. Structures having other shapes also can be used to reinforce the end wall 42.

With continued reference to FIG. 3, the illustrated outer cover preferably also comprises one or more gripping structures 46. Any suitable gripping structure 46 can be used. In the illustrated configuration, the gripping structure 46 comprises one or more ribs. Preferably, the gripping structures 46 comprise three ribs that are generally symmetrically arranged about the periphery of the cylindrical side or outer wall 40. In the illustrated configuration, at least one of the ribs 46 also comprises a hole 48 or the like such that a tether, cable or chain be secured to the cap 24. Moreover, as shown, the illustrated ribs 46 have an undercut 50 on each side to provide enhanced gripping of the gripping structure 46 by hand or any suitable mechanical tool. While the ribs 46 are shown, other suitable constructions also can be used. Moreover, while the illustrated ribs 46 are integrally formed with the outer cover 30, the gripping structure 46 need not be integrally formed but may be separately attached.

With reference again to FIG. 2, the outer cover 34 also comprises a passageway 52. In the illustrated configuration, the passageway 52 is positioned along a central axis A of the inner cap 32. Other positions also can be used. The passageway 52 preferably extends through the circular end wall 42 and more preferably extends through the boss 44.

The illustrated passageway 52 comprises a first counterbore portion 54, a second counterbore portion 56 and a hole portion 58. The first counterbore portion 54 preferably is sized and configured to accommodate a head of a tool (e.g., the tool described in U.S. Pat. No. 6,487,882, which is hereby incorporated by reference in its entirety) while the second counterbore portion 56 preferably is sized and configured to accommodate a head 60 of an actuator bolt 62. A shaft 64 of the actuator bolt 62 extends through the hole portion 58.

Figure 4:
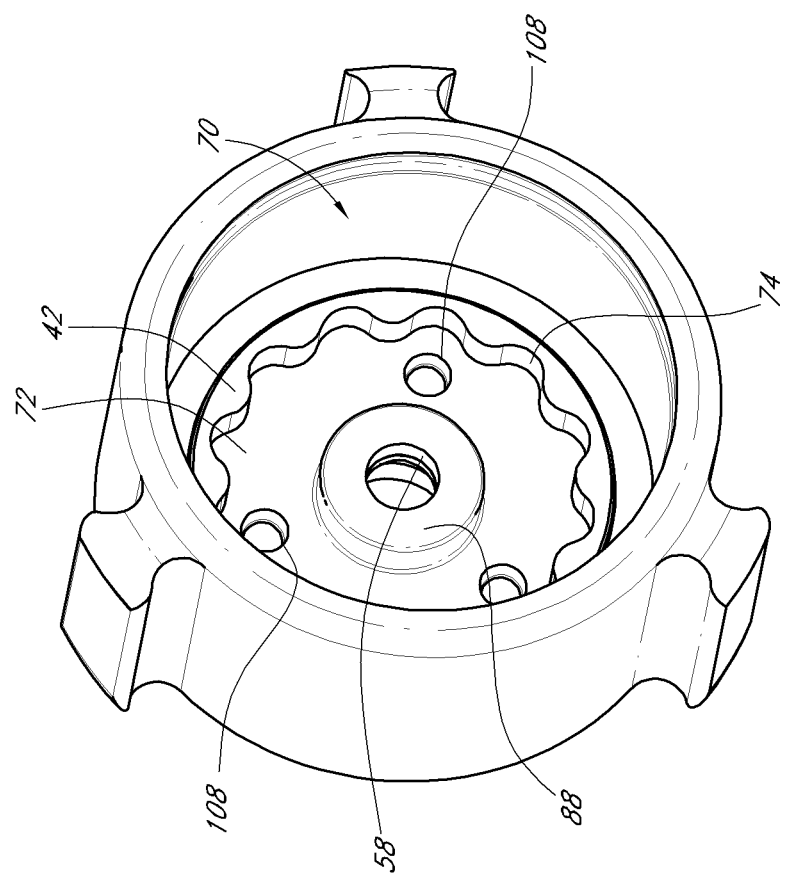
FIG. 4 is a perspective view of an outer cover of the locking cap of FIG. 1.

With reference now to FIG. 4, the outer cover 30 also defines an inner chamber 70. The traveler 34 and the inner cap 32 preferably are positioned within the inner chamber 70. Such a positioning greatly reduces the likelihood of removal of a locked cap 24 through tampering. As illustrated in FIG. 4, a recess 72 can be defined in the end wall 42. The recess 72 can be sized and configured to receive at least a portion of the traveler 34. The recess 72 preferably is generally symmetrical about the center axis A. In the illustrated configuration, the recess 72 comprises an undulating side wall 74. The undulating side wall defines multiple lobes about the periphery of the recess 72. Other shapes and configurations are possible.

Figure 5:
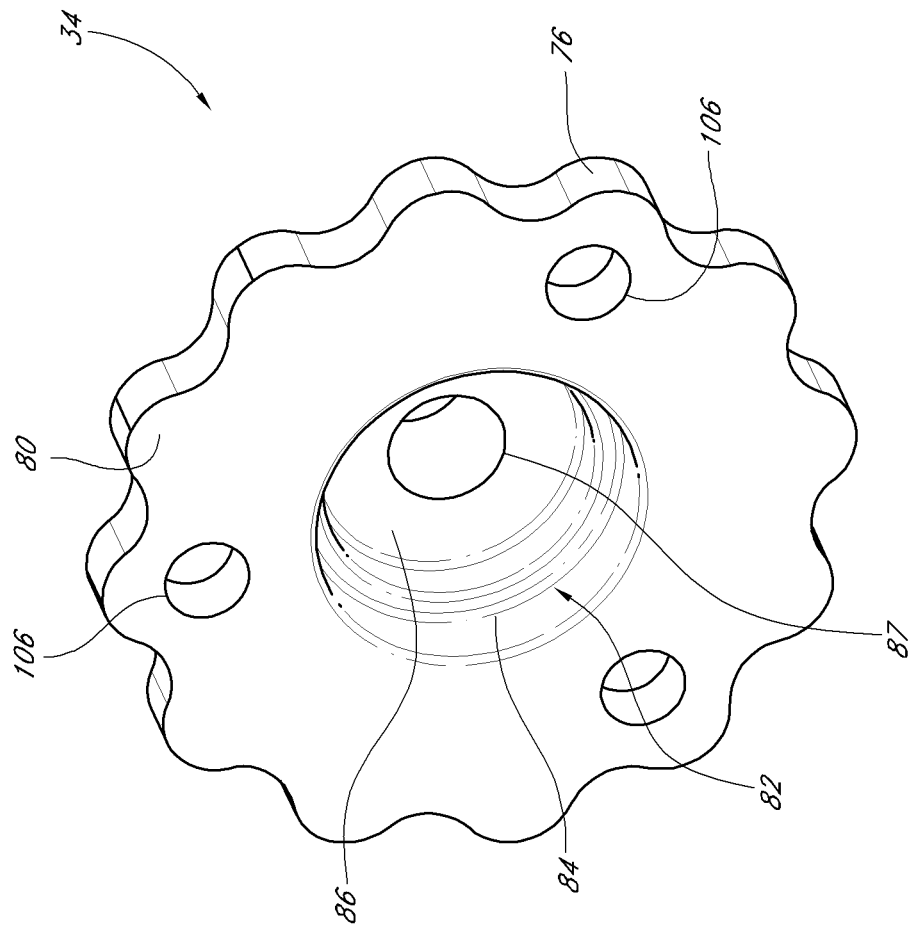
FIG. 5 is a perspective view of a traveler of the locking cap of FIG. 1.

With reference to FIG. 5, one embodiment of the traveler 34 is shown in perspective view. The traveler 34 preferably is made of sintered stainless steel. Similar to the outer cover 30, the sintered stainless steel can be advantageous due to its resistance to corrosion in some environments. Although it is preferable to use sintered stainless steel in the above described embodiment, other embodiments may be better suited to use alternate materials. Such alternate materials can include cast iron, aluminum, carbon fiber, sintered brass, or other suitable materials.

As illustrated, the traveler 34 can comprise an undulating side wall 76 that complements the undulating side wall 74 of the recess 72. While differing numbers of undulations can be used, the illustrated configuration comprises the same number of undulations. Thus, the traveler 34 can move axially in and out of the at least a portion of the recess 72. Preferably, the recess has a depth that is sufficient to accommodate the entire thickness of a flange 80 defined by the undulating side wall 76. Even with such a depth, the traveler 34 preferably bottoms against a surface, such as the surface surrounding the hole 58, instead of bottoming within the recess 72 to reduce side loading of the traveler 34.

With reference again to FIG. 2, the traveler 34 comprises a stepped inner recess 82. In the illustrated configuration, the inner recess 82 defines two different diameter steps 84, 86 with a through hole 87 extending through the end of the traveler 34. The through hole 87 accommodates the shaft 64 of the bolt 62. The through hole 87 preferably is threaded. With the hole 87 being internally threaded, rotation of the bolt 62 causes axial movement of the traveler 34 relative to the outer cover 30 and the inner cap 24.

The larger diameter step 84 of the recess 82 accommodates a boss 88 (see FIG. 4) that reinforces the hole portion 58 of the outer cover 30. The smaller diameter step 86 of the recess 82 accommodates a loading component 90. The illustrated loading component 90 is a stack of Belleville washers (e.g., three washers) but wave washers or other suitable loading components can be used.

With continued reference to FIG. 2, the rear surface of the traveler 34 also preferably comprises a stepped configuration but other configurations are possible. The stepped rear surface 92 (see FIG. 5) of the traveler 34 is received within a recess 96 defined within a forward face 98 of the inner cap 32. The recess 96 preferably comprises multiple steps. In the illustrated configuration, the recess 96 comprises five steps. A through hole 100 preferably extends through the end of the inner cap 32. Again, the through hole 100 is sized and configured to accommodate the shaft 64 of the bolt 62. Preferably, the through hole 100 is not threaded such that the bolt 62 can rotate relative to the inner cap 32.

Figure 6:
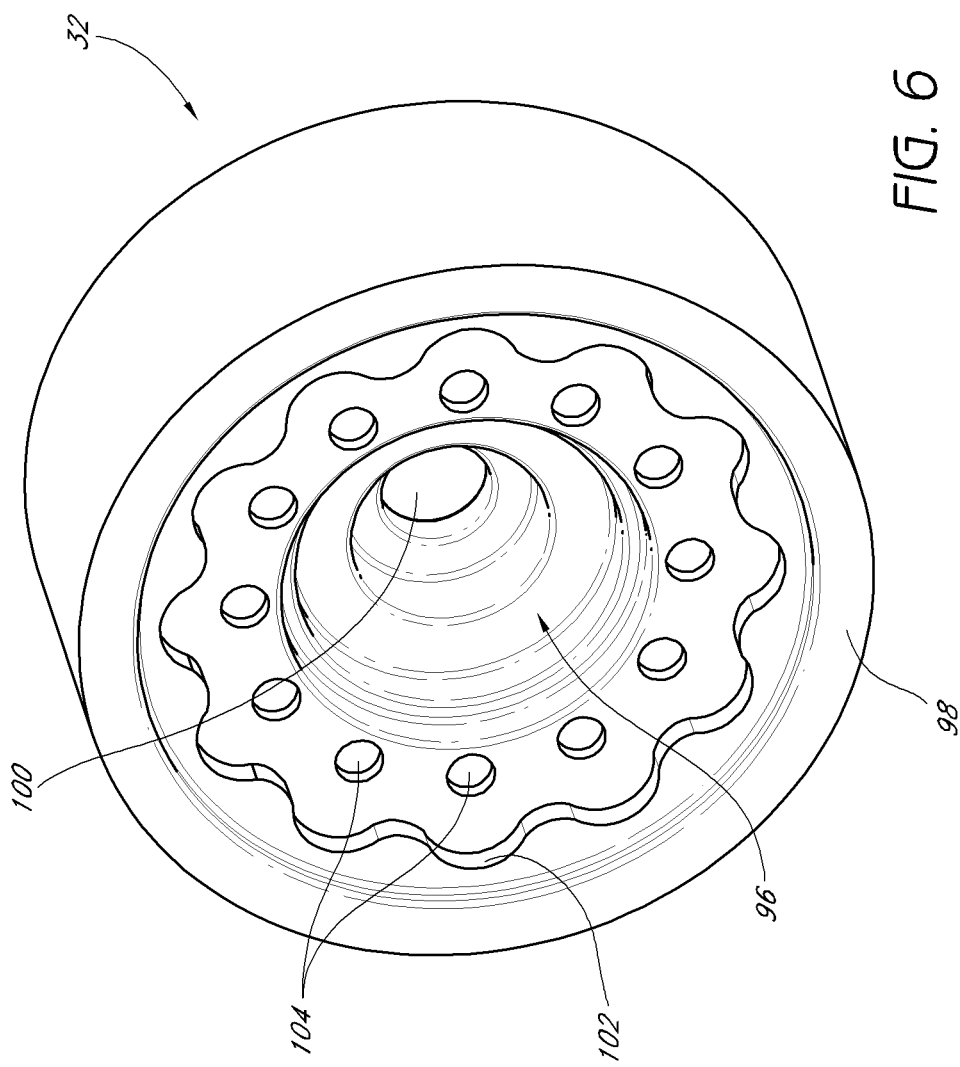
FIG. 6 is a perspective view of an inner cap of the locking cap of FIG. 1.

With continued reference to FIG. 6, the recess 96 in the forward face 98 of the inner cap 32 preferably comprises a step having an undulating side wall 102. As with the outer cover 30, the undulating side wall 102 preferably complements the undulating side wall 76 of the traveler 34. More preferably, the undulating side wall 102 and the undulating side wall 74 of the outer cover 32 are identical in configuration. In some configurations, however, the number of undulations can vary so long as the number of lobes defined by the undulations of the traveler is less than the number of lobes defined by the undulations of the inner cap 32. Preferably, this step of the recess 96 has a depth that is less than the thickness of the flange 80 of the traveler 34. Thus, in the illustrated configuration, only a portion of the thickness of the flange 80 of the traveler 34 will be positioned within in the recess 96 of the inner cap while the other portion of the thickness of the flange 80 of the traveler 34 will be positioned within the recess 72 of the outer cover 30. Accordingly, the flange 80 of the traveler 34 will couple the outer cover 30 and the inner cap 32.

It should be mentioned that the depth of the recess 96 of the inner cap 32 can be larger than the flange so long as the travel of the traveler 34 toward the inner cap 32 is limited, such as by one of the other steps of the back side of the traveler 34 abutting one of the steps of the front side of the inner cap 32. In a preferred configuration, the smallest diameter step of the traveler 34 (i.e., the one with the through hole 87) abuts against the smallest diameter step of the inner cap 32 (i.e., the one with the through hole 100). Such a configuration improves the strength of the assembly and reduces the likelihood of binding of the assembly. The stepped configuration of the traveler 34 is used to provide sufficient material thickness at all locations while accommodating the internal features of the traveler 34 and the stepped configuration of the inner cap 32 accommodates the external structure of the traveler 34. Other configurations also are possible.

The inner cap 32 preferably is made of a sintered brass. Once again, as described with reference to the outer cover 30, the inner cap 32 can be made of other suitable material which may be particular to the demands of the application.

With continued reference to FIG. 6, the step of the recess defined by the undulating wall 102 preferably comprises a plurality of generally cylindrical indentations 104. In the illustrated configuration, one indentation 104 is provided for each lobe defined by the undulating wall 102. With reference to FIGS. 4 and 5, the traveler 34 comprises openings 106 and the outer cover 30 comprises similar cylindrical indentations 108. In the illustrated configuration, the number of openings 106 corresponds to the number of indentations 108 while the number of openings/indentations is less than the number of indentations 104 formed in the inner cap 32. Preferably, the number of openings/indentations in the outer cover 30 and the traveler 34 is a subset of the number of indentations 104 in the inner cap 32 (e.g., with twelve indentations 104 in the inner cap 32, either three or four openings/indentations with three being preferred) such that the openings/indentations generally align with a set of indentations 104 in the inner cap 32 when the inner cap 32 assumes different rotational orientations relative to the traveler 34 and the outer cover 30.

With reference to the exploded isometric view of FIG. 7, balls 110 preferably are captured between the traveler 34 and the inner cap 32. The balls 100 are biased against the inner cap 32, and in particular, against the stepped surface of the recess 96 defined by the undulating wall 102. Preferably, the balls 110 are biased by springs 112 that extend from the indentations 108 of the outer cover 30, through the holes 106 of the traveler 34 and into engagement with the balls 110. In this manner, the balls 110 act as a détente mechanism and such that, when the balls 110 drop into the indentations 104 of the inner cap 32, a user knows that the traveler 34 is in a proper rotational orientation to slide into the recess 96 defined by the undulating side wall 102. In the illustrated configuration, given the 12 to 3 relationship, the balls drop into the indentations 104 with every thirty degrees of relative rotational movement between the traveler 34 and the inner cap 32. Other arrangements also can be used to indicate alignment.

With reference again to FIG. 2, a gasket 120 can be mounted to a rearward facing surface of the inner cap 34. The gasket preferably is sized and positioned to seat again the end of the pipe 22 to which the cap 24 is attached. Thus, the gasket 120 can seal or substantially seal the interface between the cap 24 and the pipe 22. For this reason, the gasket 120 preferably is positioned proximate to the inner generally cylindrical surface that will be threaded. In one configuration, the gasket 120 can be positioned within a groove or the like formed on or proximate a rearwardly facing surface of the inner cap 32.

With reference again to FIG. 7 and with additional reference to FIG. 2, a washer 122 preferably is positioned between a forward facing surface of the inner cap 32 and a rearwardly facing surface of the outer cover 30. The washer 122 reduces friction between the inner cap 32 and the outer cover 30. In one preferred configuration, the washer 122 is formed of a lightweight, low-friction and wear-resistant plastic, such as an acetal resin engineering plastic, but other materials also can be used.

A bearing ring 124 preferably extends around the periphery of the inner cap 32 and forms an interface between the inner wall of the generally cylindrical sidewall of the outer cover and the generally cylindrical outer profile of the inner cap 32. The bearing ring 124 also helps to reduce friction and wear between otherwise abutting surfaces of the inner cap 32 and the outer cover 30.

A shield ring 126 and the inner cap 32 can be secured within the recess 72 of the outer cover 30 with a snap ring 128. Other mounting configurations can be used if desired. The shield ring 126 reduces that likelihood of tampering to force the outer cover 30 to rotate with the inner cap 32. In particular, the shield ring 126 advantageously protects the interface between the inner cap 32 and the outer cover 30 from materials being wedged into the interface. Other configurations can be used.

With reference again to FIG. 2, a nut 130 can be secured to the bolt 62, which can be configured to complement the tool described above. The nut 130 preferably is formed of brass or another material that has good wear properties when exposed to harsh environments, including being exposed to water for extended periods of time. The nut 130 can be threaded onto the shaft 64 of the bolt 62. A small washer 132 can be positioned between the surface of the inner cap 32 against which the nut 130 rests and the nut 130. In one configuration, the small washer 132 is formed of the same material as the washer 122. Other materials also can be used keeping in mind the desire to reduce friction between the inner cap 32 and the bolt 62 and nut 130 combination.

Moreover, a washer 133 can be positioned between the bolt head 60 and the outer cover 30. In one configuration, the washer 133 is a pair of interlocking Nordlock washers. The pair of washers expand more than the corresponding pitch of a thread to reduce the ability of the bolt, when in a tightened position, to untighten. The washers have cams on one side with a greater angle than the pitch of the bolt and the washers have radial teet on the opposite side. In short, the washers 133 cooperate to positively lock the bolt in position even when the bolt 62 is subject to vibration or the like. Together with the biasing component 90, when the bolt 62 is tightened, the bolt 62 becomes very difficult to loosen such that the likelihood of unauthorized removal is greatly reduced.

Preferably, a groove 134 can be formed about a generally cylindrical outer surface of the nut 130. The groove 134 accommodates an o-ring 136. The o-ring 136 can be used to seal the interface between the nut 130 and the inner cap 32. Thus, with the o-ring 136 and the gasket 120, water present in the pipe 22 is substantially prevented from escaping from the otherwise sealed pipe 22.

In one configuration, the nut 130 can be secured to the bolt 62 with one or more set screws 140. In the illustrated configuration, two set screws 140 are used. Other configurations can be used to secure the nut 130 in position.

In use, the traveler 34 interlocks the outer cover 30 to the inner cap 32. With the traveler 34 in the interlocking position, the inner cap 32 can be threaded onto the pipe 22. One the inner cap 32 has been threaded onto the pipe 22 and tightened into position, the bolt 62 can be turned. As the bolt 62 is turned, the traveler 34 begins axial movement toward the outer cover 30 due to the threaded bore 87. Eventually, the traveler 34 will be moved out of contact with the inner cap 32. As the traveler 34 moves away fro the inner cap 32, the traveler 34 compresses the biasing component 90 (e.g., the Belleville washers). In addition, the biasing component 90 will draw the head 60 of the bolt 62 tighter against the outer cover 30. Thus, the head 60 of the bolt and the outer cover 30 will squeeze the pair of washers 133 together. Once the bolt 62 has been turned sufficiently to tighten it against undesired tampering, the outer cover 30 will rotate free of the inner cap 34. Thus, the inner cap 34 is locked onto the associated pipe 22.

To remove, the outer cover 30 is rotated until the balls 110 indicate through feel that the traveler 34 and outer cover 30 are properly aligned with the inner cap 32. The bolt 62 then can be turned in the opposite direction which causes the traveler 34 to move away from the outer cover 30 and unload the biasing component 90 as well as the washers 133. Eventually, the traveler 34 will interlock the outer cover 30 and the inner cap 32 such that rotation of the outer cover 30 will cause rotation of the inner cap 32. Once the two components are interlocked, the inner cap 32 can be unthreaded from the pipe 22 and the cap 24 can be removed from the pipe 22.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present locking cap assembly has been described in the context of a particularly preferred embodiment, the skilled artisan will appreciate, in view of the present disclosure, that certain advantages, features and aspects of the locking cap assembly may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A lockable pipe cap comprising:
   an inner cap comprising a portion of a pipe closure comprising an outer surface;
   an outer cover covering substantially all of said outer surface of said inner cap;
   said inner cap and said outer cover being selectively coupled by an axially translatable traveler, said traveler axially translatable between at least a first unlocked position and a second locked position;
   said traveler being movable between said first position and said second position by a lead screw, said lead screw being rotatable by an exposed end of said lead screw, and said exposed end being accessible from an outer surface of said lockable pipe cap;
   said traveler being engaged with both said inner cap and said outer cover when in said first unlocked position such that rotation of said outer cover can be used to thread said inner cap onto a pipe to be closed by said lockable pipe cap; and
   said traveler being engaged with only one of said inner cap and said outer cover when in said second locked position such that said inner cap and said outer cover are independently rotatable when said traveler is in said second unlocked position and such that said lockable pipe cap cannot be removed from the pipe to be closed by rotating said outer cover.

2. The lockable cap of claim 1, wherein said traveler is located between said inner cap and said outer cover.

3. The lockable cap of claim 2, wherein said traveler is configured to span a gap between said inner cap and said outer cover in said first unlocked position.

4. The lockable cap of claim 1, wherein said traveler threadably engages said lead screw.

5. The lockable cap of claim 1, wherein said inner cap is internally threaded such that said inner cap can be threaded onto the pipe to be closed by said lockable pipe cap.

6. The lockable cap of claim 1, wherein said outer cover defines a hole through which said lead screw is accessible by a key wrench.

7. The lockable cap of claim 1, wherein ribs are provided on an outer surface of said outer cover.

8. The lockable cap of claim 1, wherein said lead screw is located on a central axis of said cap.

9. The lockable cap of claim 1 further comprising a gasket mounted to a rearwardly facing surface of said inner cap.

10. The lockable cap of claim 1 further comprising a biasing component mounted between said traveler and said outer cover.

11. The lockable cap of claim 10 further comprising a locking washer configuration positioned between a head of said lead screw and said outer cover.

12. The lockable cap of claim 1, wherein said outer cover comprises a generally cylindrical outer wall and an end wall, said end wall comprising a protruding boss.

13. The lockable cap of claim 1, wherein said outer cover comprises one or more gripping structures.

14. The lockable cap of claim 1, wherein said outer cover comprising a side wall and an end wall, said outer cover defining an inner chamber and said end wall having an inner surface that faces said inner chamber, said traveler and said inner chamber being positioned within said inner chamber, and a recess being defined on said inner surface of said end wall, said recess being configured to receive at least a portion of said traveler.

15. The lockable cap of claim 14, wherein said recess comprises an undulating side wall that defines multiple lobes about a periphery of said recess.

16. The lockable cap of claim 14, wherein a détente mechanism is positioned between said traveler and at least one of said inner cap and said outer cover.

17. The lockable cap of claim 16, wherein said détente mechanism is positioned between said traveler and said inner cap.

18. The lockable cap of claim 17, wherein said détente mechanism comprises a biased ball and that is selectively received within any of a plurality of recesses defined within said inner cap.

19. The lockable cap of claim 17, wherein said détente mechanism comprises one or more springs that extend through at least a portion of said traveler.

20. The lockable cap of claim 1 further comprising a friction-reducing washer that is positioned between a face of said inner cap and an opposing face of said outer cover.

* * * * *